(12) United States Patent
Auld et al.

(10) Patent No.: US 12,423,064 B2
(45) Date of Patent: Sep. 23, 2025

(54) OPTIMIZING BEHAVIOR AND DEPLOYMENT OF LARGE LANGUAGE MODELS

(71) Applicant: Microsoft Technology Licensing, LLC, Redmond, WA (US)

(72) Inventors: David Herron Auld, Seattle, WA (US); Kanio Georgiev Dimitrov, Redmond, WA (US); Jafar Mahmoud Al-Kofahi, Bothell, WA (US); Jonathan Richard Malsan, Redmond, WA (US); Diana Andrea Iftimie, Sammamish, WA (US); Natasha Kohli, Bellevue, WA (US); Chenmin Liu, Seattle, WA (US); Christopher Diego Kinney, Redmond, WA (US); Haizhen Zhang, Bothell, WA (US); Daniel Akintola Fatade, Houston, TX (US); Yousef Al-Kofahi, Niskayuna, NY (US); Charles David Williams, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 167 days.

(21) Appl. No.: 18/214,716

(22) Filed: Jun. 27, 2023

(65) Prior Publication Data
US 2024/0311094 A1 Sep. 19, 2024

Related U.S. Application Data

(60) Provisional application No. 63/453,011, filed on Mar. 17, 2023.

(51) Int. Cl.
*G06F 8/33* (2018.01)
*G06F 8/35* (2018.01)
(Continued)

(52) U.S. Cl.
CPC .................. *G06F 8/33* (2013.01); *G06F 8/35* (2013.01); *G06F 8/36* (2013.01); *G06F 8/60* (2013.01)

(58) Field of Classification Search
CPC .................................................. G06F 8/33–36
See application file for complete search history.

(56) References Cited

U.S. PATENT DOCUMENTS 10,417,346 B2 9/2019 Kim et al.
10,650,100 B2 * 5/2020 Abou Mahmoud ........................ G06F 16/3344
(Continued)

FOREIGN PATENT DOCUMENTS

CN 111858903 A 10/2020
CN 112287085 A 1/2021
(Continued)

OTHER PUBLICATIONS

Jukka Keisala ; "Utilizing Large Language Models as nocode Interface in a Software Development Toolkit"; May 2023 Information and Communication Technology—Jamk University of Applied Sciences, May 2023.*

(Continued)

*Primary Examiner* — Francisco J Aponte
(74) *Attorney, Agent, or Firm* — Ray Quinney & Nebeker P.C.; Tiffany B. Healy

(57) ABSTRACT

The present disclosure relates to methods and systems that provide a framework for accelerating the development of large language models (LLM)s solutions. The present disclosure provides methods and systems that support a complete cycle for developing LLM solutions, testing the LLM solutions, deploying the LLM solutions, and providing feedback on the deployed LLM solutions.

18 Claims, 7 Drawing Sheets

(51) Int. Cl.
  *G06F 8/36* (2018.01)
  *G06F 8/60* (2018.01)

(56) References Cited

U.S. PATENT DOCUMENTS

| | | | |
|---|---|---|---|
| 11,501,754 | B2 | 11/2022 | Knight et al. |
| 11,961,005 | B1* | 4/2024 | Lum ................... G06Q 30/0202 |
| 12,008,341 | B2* | 6/2024 | Chen ......................... G06F 8/33 |
| 12,020,140 | B1* | 6/2024 | Mondlock ............ G06N 3/0455 |
| 12,039,263 | B1* | 7/2024 | Mondlock ............... G06F 40/20 |
| 12,093,658 | B1* | 9/2024 | Silver ..................... G06F 40/40 |
| 12,111,797 | B1* | 10/2024 | Lum .................. G06F 16/24544 |
| 12,130,923 | B2* | 10/2024 | Lee .......................... G06N 3/08 |
| 12,204,870 | B2* | 1/2025 | Saxe ................... G06F 9/45512 |
| 2022/0094713 | A1 | 3/2022 | Lee et al. |
| 2022/0292268 | A1 | 9/2022 | Shillingford et al. |
| 2022/0382527 | A1* | 12/2022 | Wang ................... G06F 18/214 |
| 2023/0106226 | A1 | 4/2023 | Bahrami et al. |
| 2023/0112921 | A1* | 4/2023 | Cai ........................... G06F 8/34 717/104 |
| 2023/0385037 | A1* | 11/2023 | Jayaraman ................ G06F 8/75 |
| 2024/0070270 | A1* | 2/2024 | Mace .................... G06F 21/554 |
| 2024/0143296 | A1* | 5/2024 | Hasabnis .................. G06F 8/41 |
| 2024/0202582 | A1* | 6/2024 | Schillace ............... G06N 3/045 |
| 2024/0231766 | A1* | 7/2024 | Ferreira .................... G06F 8/71 |
| 2024/0256423 | A1* | 8/2024 | Zhang ...................... G06F 8/71 |
| 2024/0281218 | A1* | 8/2024 | Masad ...................... G06F 8/33 |
| 2024/0289545 | A1* | 8/2024 | Miller ..................... G06F 40/20 |
| 2024/0311093 | A1* | 9/2024 | Schaefer .................. G06F 8/37 |
| 2024/0330863 | A1* | 10/2024 | Hajarnis ............ G06Q 10/1053 |
| 2024/0386215 | A1* | 11/2024 | Eisenschlos ........... G06F 40/40 |

FOREIGN PATENT DOCUMENTS

| | | | |
|---|---|---|---|
| CN | 113420296 A | | 9/2021 |
| CN | 114035937 A | | 2/2022 |
| CN | 114386604 A | | 4/2022 |
| CN | 117454388 A | * | 1/2024 |

OTHER PUBLICATIONS

Li, Jingyao, et al. "Motcoder: Elevating large language models with modular of thought for challenging programming tasks." (2023).*
Mitchell, Eric, et al. "Enhancing self-consistency and performance of pre-trained language models through natural language inference." (2022).*
Holt, Samuel, Max Ruiz Luyten, and Mihaela van der Schaar. "L2MAC: Large language model automatic computer for extensive code generation." (2023).*
Yang, Kaiyuan, et al. "A new design approach of hardware implementation through natural language entry." IET Collaborative Intelligent Manufacturing 5.4 (2023).*
Chen, et al., "Evaluating Large Language Models Trained on Code", In Repository of arXiv:2107.03374v1, Jul. 7, 2021, 35 Pages.
Dathathri, et al., "Plug and Play Language Models: A Simple Approach to Controlled Text Generation", In Repository of arXiv:1912.02164v4, Mar. 3, 2020, pp. 1-34.

* cited by examiner

OPTIMIZING BEHAVIOR AND DEPLOYMENT OF LARGE LANGUAGE MODELS

CROSS-REFERENCE TO RELATED APPLICATIONS

This application claims priority to and the benefit of U.S. Provisional Patent Application No. 63/453,011, filed on Mar. 17, 2023, which is hereby incorporated by reference in its entirety.

BACKGROUND

Large language models (LLMs) are offered as a generic capability to prospective customers via an application programming interface (API) for generating language completions. To successfully adapt these generic models to specific use cases requires augmenting the base capabilities of the LLM through techniques, such as, prompt-engineering or in-context learning and fine-tuning the LLM. Testing the effectiveness of a particular prompt engineering or fine-tuning technique requires developing code that performs the needed augmentation before interacting with the LLM across some number of test cases and calculating performance metrics against a ground truth. This experimentation process needs to be performed tens or hundreds of times during the development of a particular LLM-powered software capability.

BRIEF SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Some implementations relate to a method. The method includes creating an experiment with code blocks that operate on a common data model for a large language model solution, wherein the code blocks provide instructions for an output of a pretrained large language model for the large language model solution. The method includes creating model input using the code blocks. The method includes providing the model input to the pretrained large language model. The method includes receiving model output from the pretrained large language model in response to running the model input. The method includes comparing the model output to a production threshold for the large language model solution. The method includes creating a next experiment with modified code blocks for the large language model solution in response to determining the production threshold is not achieved with the experiment. The method includes continuing to provide different experiments with different code blocks for the large language model solution until the production threshold is achieved.

Some implementations relate to a device. The device includes a processor; memory in electronic communication with the processor; and instructions stored in the memory, the instructions being executable by the processor to: create an experiment with code blocks that operate on a common data model for a large language model solution, wherein the code blocks provide instructions for an output of a pretrained large language model for the large language model solution; create model input using the code blocks; provide the model input to the pretrained large language model; receive model output from the pretrained large language model in response to running the model input; compare the model output to a production threshold for the large language model solution; create a next experiment with modified code blocks for the large language model solution in response to determining the production threshold is not achieved with the experiment; and continue to provide different experiments with different code blocks for the large language model solution until the production threshold is achieved.

Some implementations relate to a method. The method includes deploying a large language model solution into a production environment. The method includes receiving feedback from end users using the large language model solution. The method includes using the feedback to measure a performance of the large language model solution.

Some implementations relate to a device. The device includes a processor; memory in electronic communication with the processor; and instructions stored in the memory, the instructions being executable by the processor to: deploy a large language model solution into a production environment; receive feedback from end users using the large language model solution; and use the feedback to measure a performance of the large language model solution.

Some implementations relate to a system. The system includes a data service system that provides data collection and data management for use with large language models; a deployment service system that deploys large language model solutions to a production environment; an inference service system that hosts the large language model solutions and obtains feedback for the large language model solutions; and an experimentation service in communication with the data service system, the deployment service system, and the inference service system, wherein the experimentation service provides an infrastructure to run different experiments for the large language model solution.

Additional features and advantages will be set forth in the description which follows, and in part will be obvious from the description, or may be learned by the practice of the teachings herein. Features and advantages of the disclosure may be realized and obtained by means of the instruments and combinations particularly pointed out in the appended claims. Features of the present disclosure will become more fully apparent from the following description and appended claims or may be learned by the practice of the disclosure as set forth hereinafter.

BRIEF DESCRIPTION OF THE DRAWINGS

In order to describe the manner in which the above-recited and other features of the disclosure can be obtained, a more particular description will be rendered by reference to specific implementations thereof which are illustrated in the appended drawings. For better understanding, the like elements have been designated by like reference numbers throughout the various accompanying figures. While some of the drawings may be schematic or exaggerated representations of concepts, at least some of the drawings may be drawn to scale. Understanding that the drawings depict some example implementations, the implementations will be described and explained with additional specificity and detail through the use of the accompanying drawings in which.

DETAILED DESCRIPTION

Figure 1:
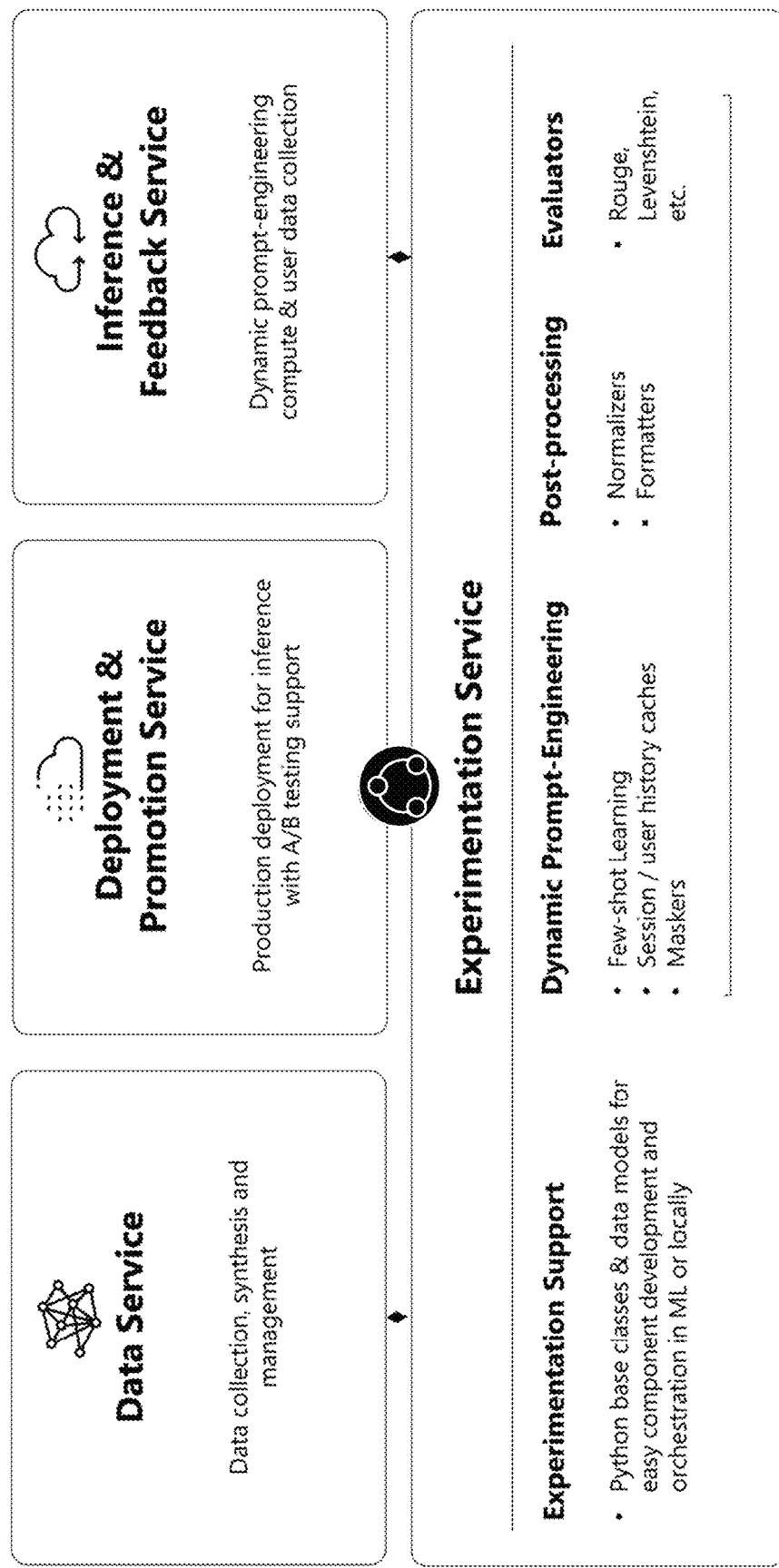
FIG. 1 illustrates an example environment for use with developing large language model solutions in accordance with implementations of the present disclosure.

Large language models (LLMs) are offered as a generic capability to prospective customers via an application programming interface (API) for generating language completions. To successfully adapt the LLMs to specific use cases requires augmenting the base capabilities of the LLM through techniques, such as, prompt-engineering or in-context learning and fine-tuning the LLM. Testing the effectiveness of a particular prompt engineering or fine-tuning technique requires developing code that performs the needed augmentation before interacting with the LLM across some number of test cases and calculating performance metrics against a ground truth. This experimentation process needs to be performed tens or hundreds of times during the development of a particular LLM-powered software capability.

Using pretrained LLMs, such as GPT-3 or CODEX, has recently grown in popularity. Interest in developing enterprise solutions with the LLMs has also increased. One of the requirements for developing any enterprise solution based on LLMs is making sure the enterprise solutions can work successfully and consistently in production environments. LLMs do not usually work "out of the box" and require a great deal of research, experimentation, and rapid iteration on ideas to reach a feasible solution. Users of LLMs typically build out their own tools and techniques to rapidly iterate on their ideas to reach the solution the users are trying to achieve.

Another requirement for developing any enterprise solution based on LLMs is a way to be sure that the solution they develop offline can function consistently in the online production setting. To do this, users typically deploy their solutions to a production setting, observe how that solution performs in production, and gathers feedback on the solutions predictions. Providing feedback allows users to collect data that guides their development of future iterations of their solutions based on real-world user interactions with their product. The tools to do this entire end-to-end life cycle are often lacking, and users often need to develop them on their own.

In addition, users working LLMs either lack LLM domain expertise or the engineering expertise to build out complete tooling for customizing the LLMs and ensuring the LLMs will function consistently in the online production setting. Lack of expertise in either area can severely inhibit any user's ability to successfully develop an LLM solution that can withstand production requirements. Users often get stuck in the development process for the LLM solutions and can lose interest in developing LLM solutions.

The present disclosure includes several practical applications that provide benefits and/or solve problems associated with developing LLM solutions. The methods and systems of the present disclosure aid in transforming the data submitted in an input prompt (e.g., prompt-engineering) to a pretrained LLM with instructions for the pretrained LLM to provide model output for the LLM solutions. In some implementations, the methods and systems modify the output data from the pretrained LLM for the LLM solutions.

The methods and systems of the present disclosure provide a framework for accelerating the development of LLM solutions for enterprise scenarios. The methods and systems focus on providing guidance for developing LLM solutions and engineering the input prompts provided to the LLM to use the LLM to achieve the LLM solutions. The methods and systems enable users to stay on the cutting-edge of the latest advances in LLM research and provide prescriptive guidance for working with LLMs and developing production-ready solutions based on LLMs. The methods and systems reduce the bar to setting up a complete LLM development environment and provide standardized tools and code models for LLM development.

The methods and systems implement a standardized method of developing the necessary augmentation code blocks as a set of tools to support the arbitrary arranging of the code blocks into a solution chain by describing the order of the code blocks within an experiment configuration. An experiment configuration includes identifiers for the specific code blocks being tested, the specific parameter values that drive the behavior of the code blocks, and pointers to data sets of test cases and ground truth for evaluating the quality of the solution. A solution chain encompasses all the scenario-specific logic required to adapt the LLM to the use case. The solution chain is submitted to the LLM in an input prompt with instructions for an output of the LLM for the LLM solution.

The solution chains are composed of preprocessors that transform or expand the string data being submitted as input to the LLM, a stitcher that formats the string, a model caller that interacts with the particular LLM, postprocessors that modify the output data, evaluators for calculating metrics on the processed output, and writers for storing the output from the LLM.

The solution chains are embedded into a broader LLM experimentation environment (a LLM solution platform) that includes an integrated capability for collecting user data, hosting solution chains for production, and managing the supporting operational needs like auditability, monitoring, and scalability. The overall architecture of such a solution comprises of tools, components, frameworks, design guidelines and other code assets.

The methods and systems provide a programing model in the form of base classes and software templates, for creating LLM augmentation code blocks. The augmentation code blocks have a common data model so they can be executed in sequence to build up an LLM prompt over multiple code blocks. The common data model defines a structure of data for use with the code blocks. In addition, the augmentation code blocks are reusable across solution chains and can be composed in different orders to achieve different experimental results. Complete chains of augmentation code blocks can be subsequently chained together and provided as input to the LLM multiple times for a particular use case.

The methods and systems provide a configuration-driven experiment orchestrator that enables users to describe solution chains without needing code. The configurations are parameterized to support executing dozens of experiments from a single configuration. The orchestrator supports promoting experiments into production, which automatically bundles the underlying code into a docker container that can be published to different environments. The methods and systems optimize the experimentation velocity of LLM solutions.

One technical advantage of the methods and systems of the present disclosure is it reduces the time to value for customers working with LLMs by helping to accelerate building an LLM solution. The methods and systems increase the likelihood of usage of the LLM by decreasing the domain expertise needed for users to successfully adapt LLMs to their use cases. The methods and systems provide the necessary automation to provision the infrastructure needed to persist and manage the data, run experiments, and host solutions for LLMs. The methods and systems reduce the likelihood of introducing human errors into the process of adapting and publishing an LLM solution into a production environment. The methods and systems also provide an experimentation framework focused on providing a cohesive user experience to go from exploration to iterative experimentation to finally arrive at production ready LLM solutions.

The methods and systems bootstrap the user exploration and experimentation with pre-defined experiments, components, and guidance on how to go about conducting LLM experimentation by aiding the user in creating the input prompts that provide instructions to the LLM for the expectations of the output from the LLM for use with the LLM solutions. The methods and systems capture the inference requests from the production setting and persist them for future experimentation. In addition, the methods and systems provide hooks to support integration with existing user systems. The methods and systems also provide extensibility points and base class implementations for customization of LLM solutions.

Referring now to FIG. 1, illustrated is an example environment 100 for use with developing LLM solutions. LLM solutions use one or more LLMs plus augmenting generate natural language text based on the patterns they learn from processing vast code to enable an AI system that is goaled for a narrower use case or task than the LLM itself. An LLM refers to machine learning artificial intelligence (AI) models that can amounts of data. LLMs use deep neural networks, such as transformers, to learn from billions or trillions of words, and to produce text on any topic or domain. LLMs can also perform various natural language processing (NLP) tasks, such as classification, summarization, translation, generation, and dialogue. Examples of LLMs include GPT-3 or CODEX.

The environment 100 integrates a data service system, a deployment and promotion service system, an inference and feedback service system, and an experiment service system together into a LLM solution platform to provide support for developing LLM solutions. The LLM solution platform provides an end-to-end life cycle for developing LLM solutions, testing the LLM solutions, and deploying the LLM solutions to a production setting. In addition, the LLM solution platform provides a centralized location for collaborating in groups on experimentation and comparing experiment results.

The LLM solution platform is accessible by users to develop LLM solutions using a device of the users. In some implementations, the LLM solution platform is on a server (e.g., a cloud server) remote from the device of the user accessed via a network. For example, the network may include the Internet or other data link that enables transport of electronic data between respective devices and/or components of the environment 100. The LLM solution platform allows users to run candidate LLM solutions as full-fledged experiments prior to deploying the LLM solution. In some implementations, the LLM solution is local to the device of the users allowing users to quickly explore and test potential solutions in a local setting before running full-fledged experiments.

The LLM solution platform includes a data service system for data collection, data synthesis, and data management. The data service system provides a store for raw data (from production & offline curation) for use with LLMs. The data service system also cleans data (to be used for experimentation). In some implementations, the data service system supports cleaning workflows for the data. The data system also provides application programming interfaces (API)s for egress to experimentation.

The LLM solution platform also includes an experimentation service system that provides an experimentation framework and infrastructure to easily run systematic, scalable, extensible, reproducible experiments on LLMs. The experimentation service system is designed for LLM-based experimentation and suitable for rapid exploration of ideas using LLMs. The experimentation service system provides rapid offline experimentations with the LLMs that are tailored for different LLM scenarios. The experimentation service system provides experimentation support (e.g., PYTHON base classes and data models for easy component development). In addition, the experimentation service system provides dynamic prompt engineering for the experiments with the LLMs (e.g., few-shot learning, session/user history caches, and/or maskers). The experimentation service system also provides post-processing support for the experiments with the LLMs (e.g., normalizers, formatters). The experimentation service system also provides evaluators of the experiments with the LLMs.

The LLM solution platform also includes a deployment and promotion service system that provides logic to convert experiments to packaged solutions for deployment as inference solutions. The deployment and promotion service system packages experiments for solution deployment and runs testing.

The LLM solution platform also includes an inference service system that hosts the deployed LLM solution and simultaneously collects real-world inference calls and user feedback from the production setting. The feedback received from the usage of the deployed LLM solutions is fed back to the data system for storage and use in analysis of the deployed LLM solution. The inference service system provides dynamic prompt-engineering and compute and user data collection.

The LLM solution platform provides information that informs users whether further iteration in experimentation is needed prior to deploying the LLM solutions. In some implementations, experiment metrics are provided to the user using the LLM solution platform and the users evaluate the experiment metrics to determine when the candidate LLM solution is ready for deployment to a production environment (e.g., for use by end users).

The LLM solution platform aids users in deploying the LLM solutions. In some implementations, deployment includes an inference solution and logic to capture inference calls that are forwarded to the data system. In addition, the LLM solution platform aids users in capturing feedback on the deployed solution. The feedback is collected and associated back to the inference call and the data is stored in the data system.

The LLM solution platform makes it easy for users to connect production environments to the LLM solution platform. In some implementations, a PYTHON package software development kit (SDK) enables users to interact with each of these systems via code, including clients for data curation, triggering local experiments, triggering experiments on remote machine learning systems, deploying inference solutions, and collecting production inference calls and corresponding feedback from end-users.

In some implementations, one or more computing devices (e.g., servers and/or devices) are used to perform the processing of the environment 100. The one or more computing devices may include, but are not limited to, server devices, personal computers, a mobile device, such as, a mobile telephone, a smartphone, a PDA, a tablet, or a laptop, and/or a non-mobile device. The features and functionalities discussed herein in connection with the various systems may be implemented on one computing device or across multiple computing devices. For example, the data service system, the deployment and promotion service system, the inference and feedback service system, and the experimentation service system are implemented wholly on the same computing device. Another example includes one or more subcomponents of the data service system, the deployment and promotion service system, the inference and feedback service system, and/or the experimentation service system are implemented across multiple computing devices. Moreover, in some implementations, one or more subcomponent of the data service system, the deployment and promotion service system, the inference and feedback service system, and/or the experimentation service system may be implemented and processed on different server devices of the same or different cloud computing networks.

In some implementations, each of the components of the environment 100 is in communication with each other using any suitable communication technologies. In addition, while the components of the environment 100 are shown to be separate, any of the components or subcomponents may be combined into fewer components, such as into a single component, or divided into more components as may serve a particular implementation. In some implementations, the components of the environment 100 include hardware, software, or both. For example, the components of the environment 100 may include one or more instructions stored on a computer-readable storage medium and executable by processors of one or more computing devices. When executed by the one or more processors, the computer-executable instructions of one or more computing devices can perform one or more methods described herein. In some implementations, the components of the environment 100 include hardware, such as a special purpose processing device to perform a certain function or group of functions. In some implementations, the components of the environment 100 include a combination of computer-executable instructions and hardware.

Figure 2:
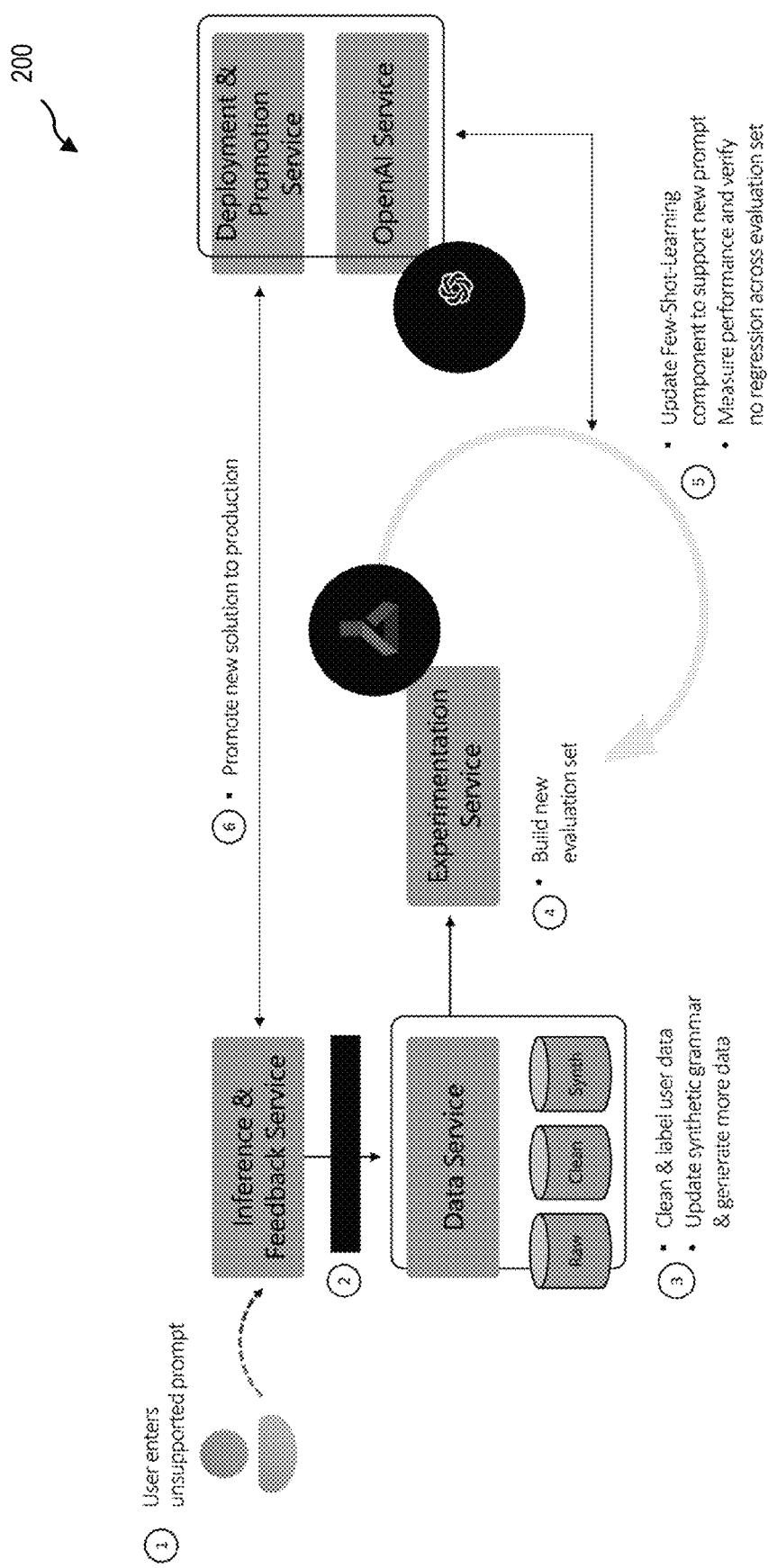
FIG. 2 illustrates an example method for developing large language model solutions in accordance with implementations of the present disclosure.

Referring now to FIG. 2, illustrated is an example method 200 for developing large language model solutions. The actions of the method 200 are discussed below in reference to FIG. 1. At 1, the user provides a prompt to the inference and feedback service. At 2, the inference and feedback service captures the new prompt and forwards the new prompt to the data service. At 3, the data services cleans and labels the user data. The data service updates synthetic grammar of the user data and generates more data.

At 4, the user builds a new evaluation set using the experimentation service. In some implementations, the new evaluation set includes code blocks for a large language model solution. At 5, the experimentation service performs an experiment with the new evaluation set using the LLM. The experimentation service measures performance of the new evaluation set and verifies no regression across the evaluation set. At 6, the deployment and promotion service promotes the new solution using the LLM to production.

Figure 3:
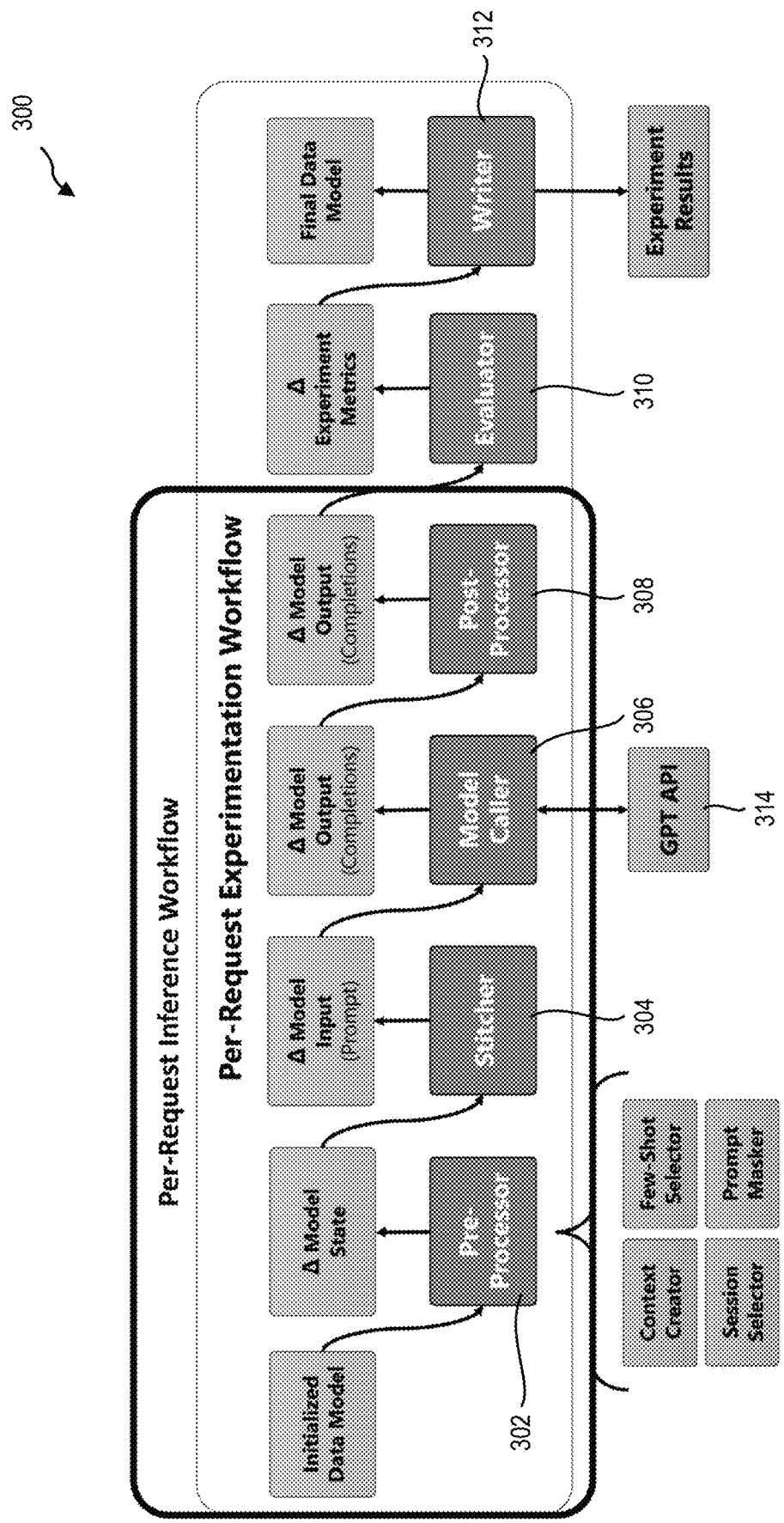
FIG. 3 illustrates an example method for conducting experiments on large language models in accordance with implementations of the present disclosure.

Referring now to FIG. 3, illustrated is an example method 300 for conducting different experiments on LLMs using different components of the experimentation service of the LLM service platform (FIG. 1). A component is a code module with an implementation of the component class. The component class execution logic is responsible for applying one specific operation to a code block, which follows a well-defined contract that operates on data models. The common data model defines a structure of data for use with the code blocks. The components interact with different portions of the LLM solution platform (FIG. 1).

A preprocessor component 302 gathers and modifies information used to construct an input prompt that is sent to an LLM 314. The input prompt is the inputs or queries that a user or a program provides to the LLM in order to elicit a specific response from the LLM in response to the input prompt. In some implementations, the information used to construct the input prompt is code blocks for a large language model solution. In some implementations, preprocessors work off of information available in the original request (except the ground truth) for the LLM 314 and prepare information in the model state of the data model for later consumption. The original request is sent by the client application of the LLM solution and includes both the command asking for the output of the LLM solution as well as complementary data that may be of use to the preprocessors in performing their desired function. The model state is an internal representation of all the textual information and supporting variables that the LLM solution might require to perform its desired function. Each preprocessor will either augment or transform the model state as a result of its coded logic before handing off the model state to the next preprocessor to perform its function. Examples of the preprocessor component 302 include few-shot selectors, prompt maskers, and/or context selectors.

A stitcher component 304 takes information collected in the model state of the data model and stitches this information into a single string input prompt (the model input). The stitcher acts as a template where data stored in the model state is placed into its corresponding location in the template. In some implementations, the stitcher component 304 follows a templated format defined in the stitcher component logic.

A model caller component 306 makes the call to the LLM 314. The model caller component 306 uses the input prompt available in the model input and outputs completions to the model output of the data model.

A post processor component 308 post-processes the completion output by the LLM 314 (modifies the model output in place). Post processors operate on the output of the LLM but prior to either experimentally validating the quality of the output or sending the output back to the client application. Examples of post-processes include completion unmaskers, completion discriminator (in event that multiple completions are returned), language normalizers (e.g., named arguments vs. positional arguments).

An evaluator component 310 is an experiment component that compares the final post-processed model output completions against the ground truth provided in the experiment request. An experiment request is function call to the LLM solution that comes from an experimentation service, in contrast to a client application, and specifically includes the expected output of the LLM solution in addition to the data necessary for the preprocessors to execute. Examples of evaluator components include PYTHON syntax checker, LEVENSHTEIN distance-based text similarity, ROUGE score text similarity, or other measures corresponding to the business objective.

A writer component 312 is an experiment component that writes experiment results to an output location. Each experiment conducted on the LLM 314 using the LLM solution platform (FIG. 1) is designed to easily convert to an inference solution (box around the pre-processor component 302, the stitcher component 304, the model caller component 306, and the post-processing component 308). The experiments created using the LLM solution platform are chains of the components (box around the pre-processor component 302, the stitcher component 304, the model caller component 306, the post-processing component 308, evaluator component 310, writer components 312) that operate on the data models, resulting in experiments that data model pipelined.

In some implementations, each component (e.g., the pre-processor component 302, the stitcher component 304, the model caller component 306, the post-processing component 308, evaluator component 310, writer components 312) is defined by a single entry in a YAML configuration.

Figure 4:
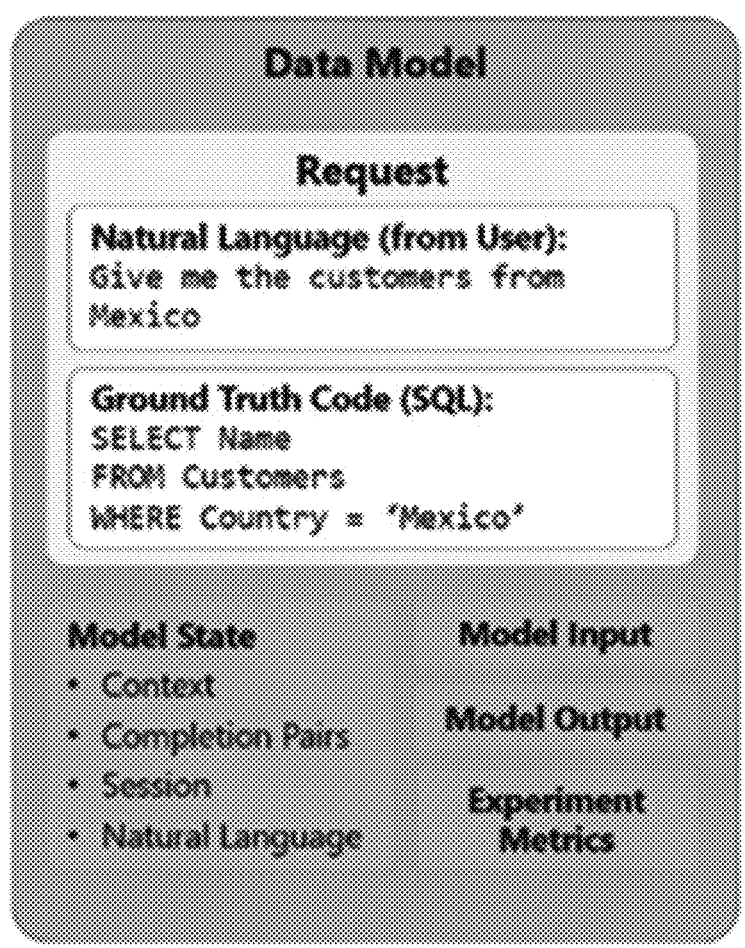
FIG. 4 illustrates an example data model for use with implementations of the present disclosure.

Referring now to FIG. 4, illustrated is an example data model 400 for use with the LLM solution platform (FIG. 1) and the method 300 (FIG. 3). The data model 400 provides an interface for experimentation with the LLMs 314 (FIG. 3). The different experiences with the LLMs run on data models (e.g., the data model 400). Each data model 400 is built around an experiment request (data available at inference+ground truth). The data models provide a common interface between different components within experimentation, which allows easy experiments with different chains of component implementations. A component is a code module with an implementation of the component class. The component class execution logic is responsible for applying one specific operation to a data model 400, which follows a well-defined contract that operates on data models.

Users of the LLM solution platform (FIG. 1) can easily swap out different component implementations to try out new experiments because of the modular design of experiments with components that run on data models with common contracts and component configs that map to component code. For example, the user exchanges the code 602 for the static context preprocessor component with the code 604.

In some implementations, the LLM solution platform provides built-in components to help users get started with creating an experiment on an LLM. For example, the LLM solution platform provides templates with the built-in components. Users can extend the base collection, modify the base collection, and/or add new components to the base collection, enable the users to try out component definitions created by the users and experiment with the component definitions.

Figure 5:
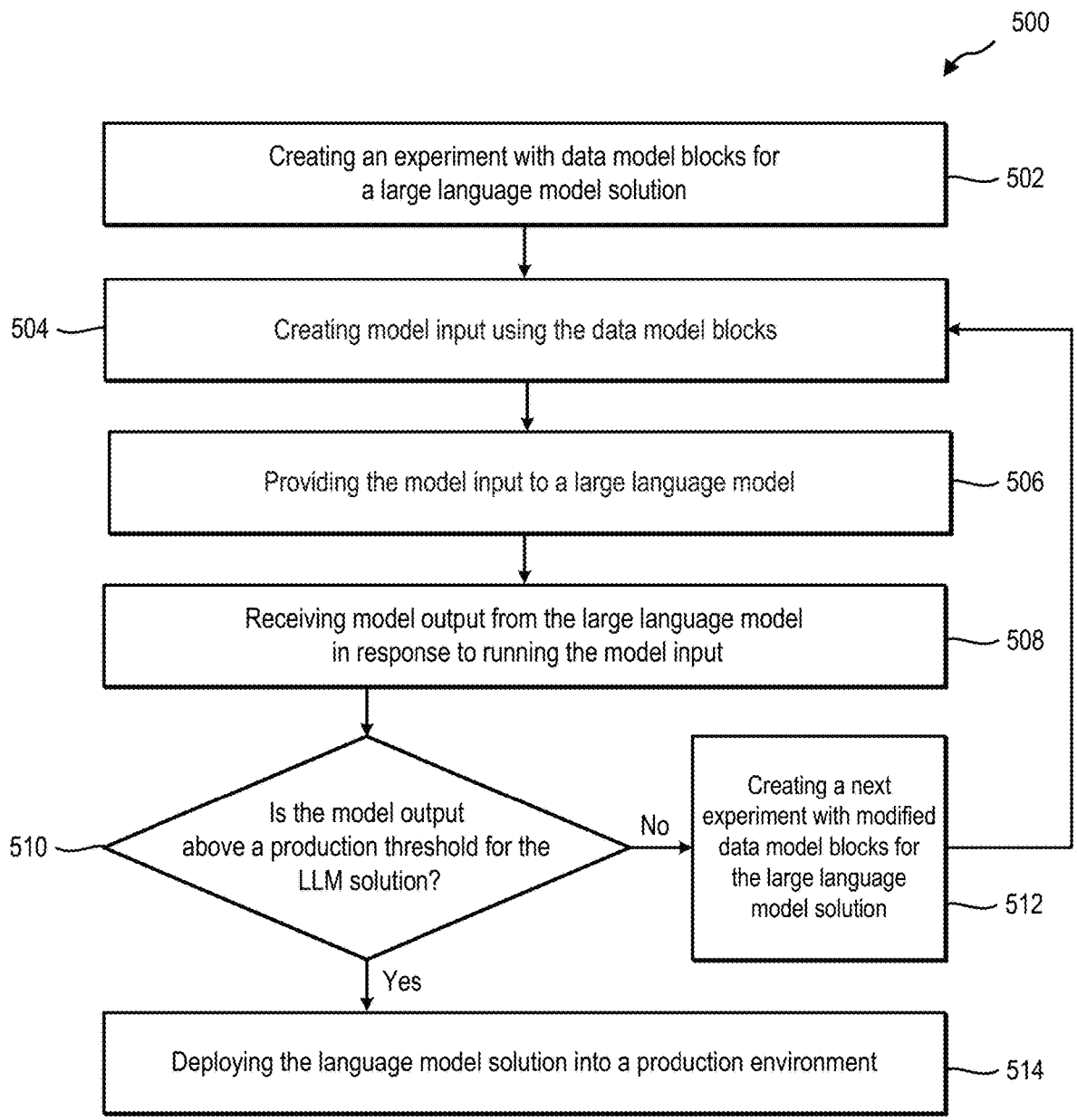
FIG. 5 illustrates an example method for developing large language model solutions in accordance with implementations of the present disclosure.

Referring now to FIG. 5, illustrated is an example method 500 for developing large language model solutions. The actions of the method 500 are discussed below with reference to FIGS. 1-4. The method 500 is performed by the experimentation service of the LLM solution platform (FIG. 1).

At 502, the method 500 includes creating an experiment with code blocks that operate on a common data model for a large language model solution. In some implementations, the experiment is created in response to a user describing a result for the large language model solution and an input prompt is created using the code blocks to provide instructions to the LLM 314 to achieve the result for the large language model solution.

In some implementations, the code blocks provide instructions for an output of a pretrained LLM 314 for the large language model solution. In some implementations, the common data model 400 defines a structure of data for use with the code blocks. In some implementations, the code blocks are reusable across different experiments for the large language model solution. In some implementations, code block templates are provided for use in creating the experiments and the code blocks for the experiments. In some implementations, the code block templates are further modified by a user to achieve a specific task for the large language model solution. For example, a preprocessor component 302 gathers and modifies information used to construct an input prompt that is sent to the LLM 314 using the code blocks.

At 504, the method 500 includes creating model input using the code blocks. In some implementations, the code blocks are placed into a single string prompt in an order. For example, a stitcher component 304 places the code blocks into a single string prompt in an order. In some implementations, a different order of the code blocks achieves different experimental results.

At 506, the method 500 includes providing the model input to an LLM. For example, a model caller component 306 provides the model input to the LLM 314. At 508, the method 500 includes receiving model output from the LLM in response to running the model input. In some implementations, post-processing is performed on the model output by a post processor component 308, wherein the post processing includes performing completion unmaskers, performing completion discriminator, or performing language normalization.

At 510, the method 500 includes comparing the model output to a production threshold. In some implementations, the production threshold indicates the large language model solution is ready for deployment into a production environment for use by end users. For example, an evaluator component 310 compares the model output to a production threshold.

At 512, the method 500 includes creating a next experiment with modified code blocks for the large language model solution in response to determining the production threshold is not achieved with the experiment. In some implementations, the modified code blocks are created in response to the model output for previous experiments. In some implementations, the modified code blocks include modifications to code of the data blocks. In some implementations, the modified code blocks include selecting a different data block for use with the data blocks. In some implementations, over a hundred different experiments are conducted for the large language model solution until the production threshold is achieved.

At 514, the method 500 includes deploying the large language model solution into a production environment in response to a production threshold being achieved with the different experiments.

Figure 6:
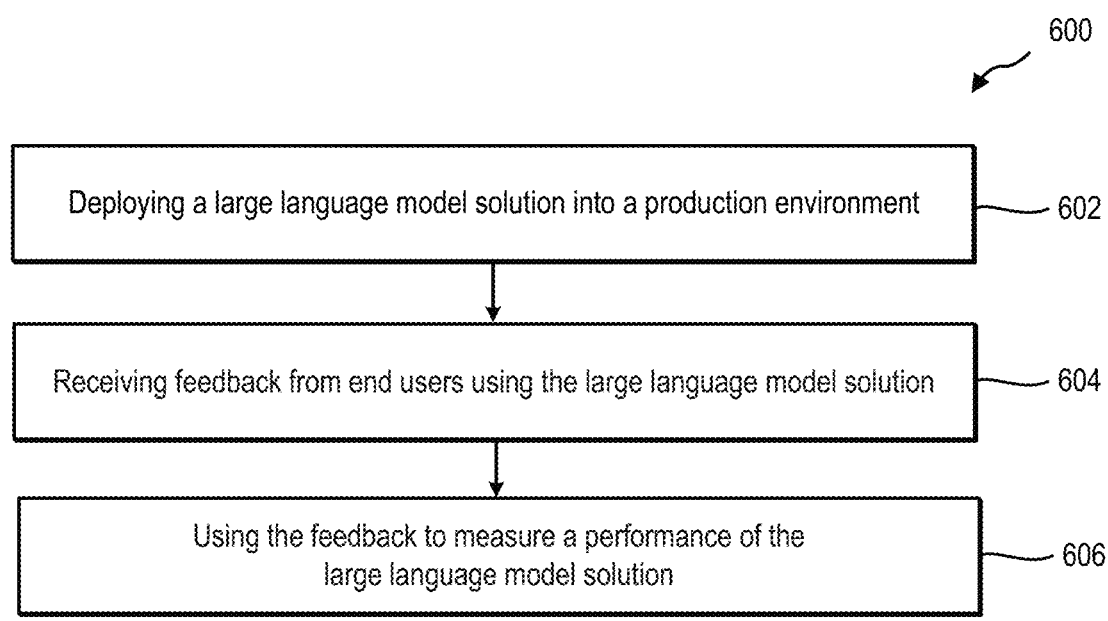
FIG. 6 illustrates an example method for collecting feedback from deployed large language model solutions in accordance with implementations of the present disclosure.

Referring now to FIG. 6, illustrated is an example method 600 for collecting feedback from deployed large language model solutions. The actions of the method 600 are discussed below with reference to FIGS. 1-7. The method 600 is performed by the LLM solution platform (FIG. 1). In some implementations, the method 600 is performed by the inference service system of the LLM solution platform (FIG.

1). In some implementations, the method 600 is performed by the inference service system and the experimentation service of the LLM solution platform (FIG. 1).

At 602, the method 600 includes deploying a large language model solution into a production environment. The large language model solution uses the LLM 314 to perform a specific task. At 604, the method 600 includes receiving feedback from end users using the large language model solution. At 606, the method includes using the feedback to measure a performance of the large language model solution. In some implementations, the feedback is received by capturing inference calls that are forwarded to the data system from the large language model solution.

In some implementations, the method 600 includes modifying the large language model solution in response to the performance of the LLM 314 being below a threshold. In some implementations, modifying the large language model solution includes creating an experiment with code blocks that operation on a common data model for the large language model solution; creating model input using the code blocks; providing the model input to the LLM 314; receiving model output from the LLM 314 in response to running the model input; and modifying the large language model solution in response to the model output.

Figure 7:
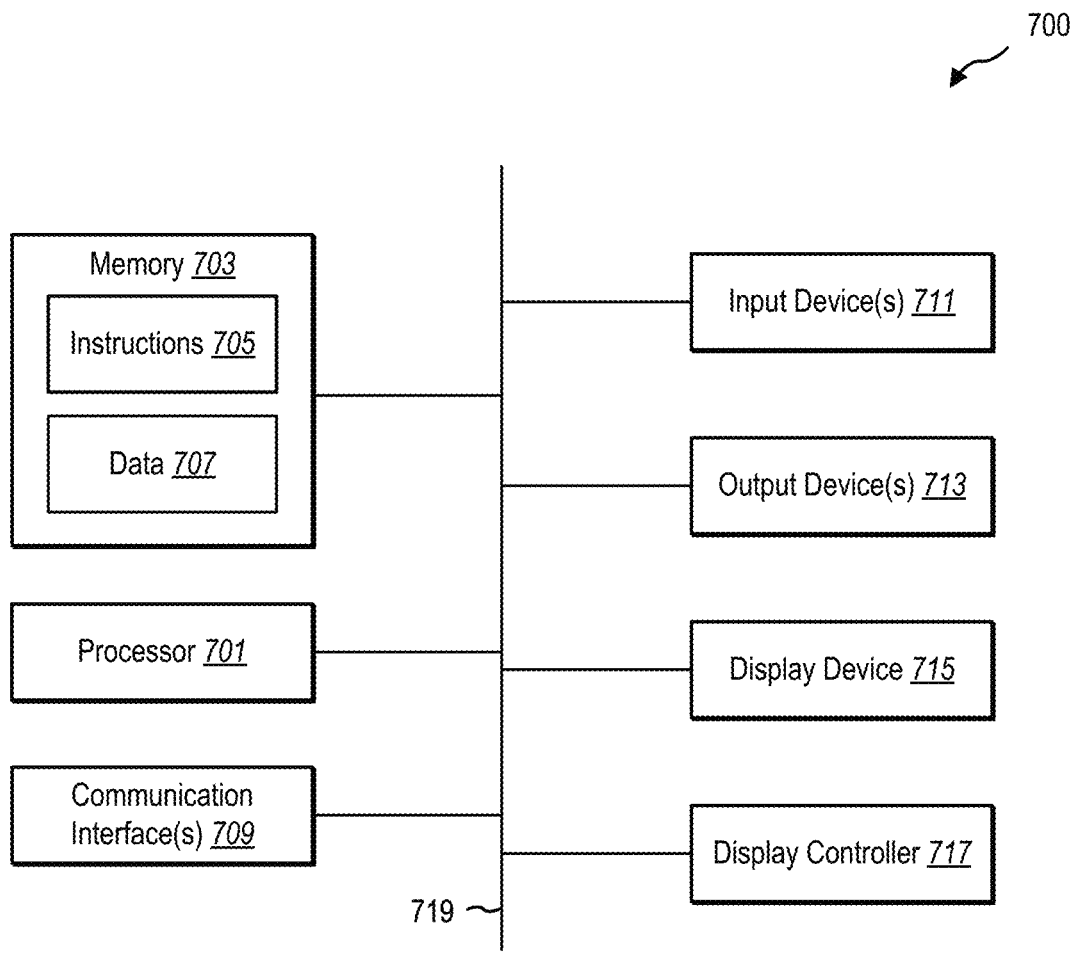
FIG. 7 illustrates components that may be included within a computer system.

FIG. 7 illustrates components that may be included within a computer system 700. One or more computer systems 700 may be used to implement the various methods, devices, components, and/or systems described herein.

The computer system 700 includes a processor 701. The processor 701 may be a general-purpose single or multi-chip microprocessor (e.g., an Advanced RISC (Reduced Instruction Set Computer) Machine (ARM)), a special purpose microprocessor (e.g., a digital signal processor (DSP)), a microcontroller, a programmable gate array, etc. The processor 701 may be referred to as a central processing unit (CPU). Although just a single processor 701 is shown in the computer system 700 of FIG. 7, in an alternative configuration, a combination of processors (e.g., an ARM and DSP) could be used.

The computer system 700 also includes memory 703 in electronic communication with the processor 701. The memory 703 may be any electronic component capable of storing electronic information. For example, the memory 703 may be embodied as random access memory (RAM), read-only memory (ROM), magnetic disk storage mediums, optical storage mediums, flash memory devices in RAM, on-board memory included with the processor, erasable programmable read-only memory (EPROM), electrically erasable programmable read-only memory (EEPROM) memory, registers, and so forth, including combinations thereof.

Instructions 705 and data 707 may be stored in the memory 703. The instructions 705 may be executable by the processor 701 to implement some or all of the functionality disclosed herein. Executing the instructions 705 may involve the use of the data 707 that is stored in the memory 703. Any of the various examples of modules and components described herein may be implemented, partially or wholly, as instructions 705 stored in memory 703 and executed by the processor 701. Any of the various examples of data described herein may be among the data 707 that is stored in memory 703 and used during execution of the instructions 705 by the processor 701.

A computer system 700 may also include one or more communication interfaces 709 for communicating with other electronic devices. The communication interface(s) 709 may be based on wired communication technology, wireless communication technology, or both. Some examples of communication interfaces 709 include a Universal Serial Bus (USB), an Ethernet adapter, a wireless adapter that operates in accordance with an Institute of Electrical and Electronics Engineers (IEEE) 802.11 wireless communication protocol, a Bluetooth® wireless communication adapter, and an infrared (IR) communication port.

A computer system 700 may also include one or more input devices 711 and one or more output devices 713. Some examples of input devices 711 include a keyboard, mouse, microphone, remote control device, button, joystick, trackball, touchpad, and lightpen. Some examples of output devices 713 include a speaker and a printer. One specific type of output device that is typically included in a computer system 700 is a display device 715. Display devices 715 used with embodiments disclosed herein may utilize any suitable image projection technology, such as liquid crystal display (LCD), light-emitting diode (LED), gas plasma, electroluminescence, or the like. A display controller 717 may also be provided, for converting data 707 stored in the memory 703 into text, graphics, and/or moving images (as appropriate) shown on the display device 715.

In some implementations, the various components of the computer system 700 are implemented as one device. For example, the various components of the computer system 700 are implemented in a mobile phone or tablet. Another example includes the various components of the computer system 700 implemented in a personal computer.

As illustrated in the foregoing discussion, the present disclosure utilizes a variety of terms to describe features and advantages of the model evaluation system. Additional detail is now provided regarding the meaning of such terms. For example, as used herein, a "machine learning model" refers to a computer algorithm or model (e.g., a classification model, a clustering model, a regression model, a language model, an object detection model) that can be tuned (e.g., trained) based on training input to approximate unknown functions. For example, a machine learning model may refer to a neural network (e.g., a convolutional neural network (CNN), deep neural network (DNN), recurrent neural network (RNN)), or other machine learning algorithm or architecture that learns and approximates complex functions and generates outputs based on a plurality of inputs provided to the machine learning model. As used herein, a "machine learning system" may refer to one or multiple machine learning models that cooperatively generate one or more outputs based on corresponding inputs. For example, a machine learning system may refer to any system architecture having multiple discrete machine learning components that consider different kinds of information or inputs.

The techniques described herein may be implemented in hardware, software, firmware, or any combination thereof, unless specifically described as being implemented in a specific manner. Any features described as modules, components, or the like may also be implemented together in an integrated logic device or separately as discrete but interoperable logic devices. If implemented in software, the techniques may be realized at least in part by a non-transitory processor-readable storage medium comprising instructions that, when executed by at least one processor, perform one or more of the methods described herein. The instructions may be organized into routines, programs, objects, components, data structures, etc., which may perform particular tasks and/or implement particular data types, and which may be combined or distributed as desired in various implementations.

Computer-readable mediums may be any available media that can be accessed by a general purpose or special purpose computer system. Computer-readable mediums that store computer-executable instructions are non-transitory computer-readable storage media (devices). Computer-readable mediums that carry computer-executable instructions are transmission media. Thus, by way of example, and not limitation, implementations of the disclosure can comprise at least two distinctly different kinds of computer-readable mediums: non-transitory computer-readable storage media (devices) and transmission media.

As used herein, non-transitory computer-readable storage mediums (devices) may include RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

The steps and/or actions of the methods described herein may be interchanged with one another without departing from the scope of the claims. In other words, unless a specific order of steps or actions is required for proper operation of the method that is being described, the order and/or use of specific steps and/or actions may be modified without departing from the scope of the claims.

The term "determining" encompasses a wide variety of actions and, therefore, "determining" can include calculating, computing, processing, deriving, investigating, looking up (e.g., looking up in a table, a database, a datastore, or another data structure), ascertaining and the like. Also, "determining" can include receiving (e.g., receiving information), accessing (e.g., accessing data in a memory) and the like. Also, "determining" can include resolving, selecting, choosing, establishing, predicting, inferring, and the like.

The articles "a," "an," and "the" are intended to mean that there are one or more of the elements in the preceding descriptions. The terms "comprising," "including," and "having" are intended to be inclusive and mean that there may be additional elements other than the listed elements. Additionally, it should be understood that references to "one implementation" or "an implementation" of the present disclosure are not intended to be interpreted as excluding the existence of additional implementations that also incorporate the recited features. For example, any element described in relation to an implementation herein may be combinable with any element of any other implementation described herein. Numbers, percentages, ratios, or other values stated herein are intended to include that value, and also other values that are "about" or "approximately" the stated value, as would be appreciated by one of ordinary skill in the art encompassed by implementations of the present disclosure. A stated value should therefore be interpreted broadly enough to encompass values that are at least close enough to the stated value to perform a desired function or achieve a desired result. The stated values include at least the variation to be expected in a suitable manufacturing or production process, and may include values that are within 5%, within 1%, within 0.1%, or within 0.01% of a stated value.

A person having ordinary skill in the art should realize in view of the present disclosure that equivalent constructions do not depart from the spirit and scope of the present disclosure, and that various changes, substitutions, and alterations may be made to implementations disclosed herein without departing from the spirit and scope of the present disclosure. Equivalent constructions, including functional "means-plus-function" clauses are intended to cover the structures described herein as performing the recited function, including both structural equivalents that operate in the same manner, and equivalent structures that provide the same function. It is the express intention of the applicant not to invoke means-plus-function or other functional claiming for any claim except for those in which the words 'means for' appear together with an associated function. Each addition, deletion, and modification to the implementations that falls within the meaning and scope of the claims is to be embraced by the claims.

The present disclosure may be embodied in other specific forms without departing from its spirit or characteristics. The described implementations are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A method, comprising:
   creating an experiment with code blocks that operate on a common data model for a large language model solution, wherein the code blocks provide instructions for an output of a pretrained large language model for the large language model solution;
   creating model input using the code blocks;
   providing the model input to the pretrained large language model;
   receiving model output from the pretrained large language model in response to running the model input;
   comparing the model output to a production threshold for the large language model solution;
   creating a next experiment with modified code blocks for the large language model solution in response to determining the production threshold is not achieved with the experiment;
   continuing to provide different experiments with different code blocks for the large language model solution until the production threshold is achieved; and
   deploying the large language model solution into a production environment in response to a production threshold being achieved with the different experiments.

2. The method of claim 1, wherein the common data model defines a structure of data for use with the code blocks.

3. The method of claim 1, wherein the code blocks are reusable across different experiments for the large language model solution.

4. The method of claim 1, wherein creating the model input further comprises:
   placing the code blocks into a single string prompt in an order.

5. The method of claim 4, wherein a different order of the code blocks achieves different experimental results.

6. The method of claim 1, wherein the modified code blocks are created in response to the model output for previous experiments.

7. The method of claim 1, wherein the modified code blocks include modifications to code of the code blocks.

8. The method of claim 1, wherein the modified code blocks include selecting a different code block for use with the code blocks.

9. The method of claim 1, further comprising:

performing post processing on the model output, wherein the post processing includes performing completion unmaskers, performing completion discriminator, or performing language normalization.

10. The method of claim 1, wherein the production threshold indicates the large language model solution is ready for deployment into a production environment for use by end users.

11. The method of claim 1, wherein the different experiments include over a hundred experiments.

12. The method of claim 1, wherein the experiment is created in response to a user describing a result for the large language model solution and an input prompt is created using the code blocks to provide instructions to the large language model to achieve the result for the large language model solution.

13. A device, comprising:
a memory to store data and instructions; and
a processor operable to communicate with the memory, wherein the processor is operable to:
create an experiment with code blocks that operate on a common data model for a large language model solution, wherein the code blocks provide instructions for an output of a pretrained large language model for the large language model solution;
create model input using the code blocks;
provide the model input to the pretrained large language model;
receive model output from the pretrained large language model in response to running the model input;
compare the model output to a production threshold for the large language model solution;
create a next experiment with modified code blocks for the large language model solution in response to determining the production threshold is not achieved with the experiment;
continue to provide different experiments with different code blocks for the large language model solution until the production threshold is achieved; and
deploy the large language model solution into a production environment in response to a production threshold being achieved with the different experiments.

14. The device of claim 13, wherein the common data model defines a structure of data for use with the code blocks.

15. The device of claim 13, wherein the code blocks are reusable across different experiments for the large language model solution.

16. The device of claim 13, wherein the processor is further operable to create the model input by placing the code blocks into a single string prompt in an order.

17. The device of claim 13, wherein a different order of the code blocks achieves different experimental results.

18. The device of claim 13, wherein the modified code blocks are created in response to the model output for previous experiments.

* * * * *